Figure 1:
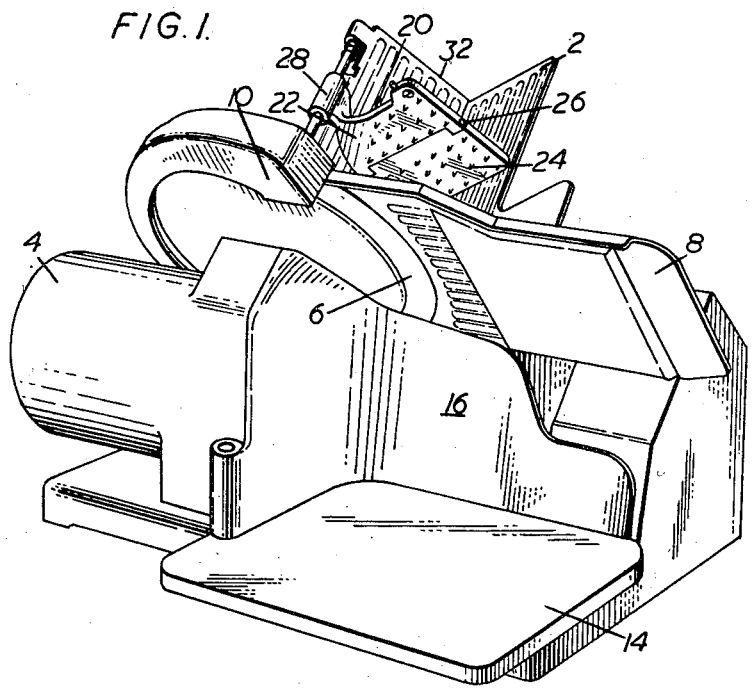

March 5, 1957  J. WIELECHOWSKI  2,783,804
FOOD SLICING MACHINES
Filed April 28, 1955

Inventor
Jozef Wielechowski
By
Dowell H Dowell
Attorneys

United States Patent Office 2,783,804
Patented Mar. 5, 1957

2,783,804
FOOD SLICING MACHINES

Jozef Wielechowski, Slough, England, assignor to Lan-Elec Limited, Slough, England Application April 28, 1955, Serial No. 504,427

3 Claims. (Cl. 146—102)

This invention relates to gravity feed food slicing machines and has for an object to provide an angle cutting device for such a machine.

A gravity feed food slicing machine of the type to which this invention is applicable includes a circular cutter, means for rotating the said cutter, a sloping chute of V cross section and means for moving the said chute across the said cutter so as to bring a food piece thereon into cutting relationship therewith.

In slicing food it is often required to present round pieces of food, such as German sausages, to the cutting blade at an oblique angle so as to cut oval slices. The food is said to be cut "on the bias." In gravity feed machines with which this invention is concerned it is not easy to hold the food at the required angle, without the use of some attachment which has to be attached to the chute when it is desired to cut on the bias. It is a further object of the invention to provide an angle cutting device which is not an attachment but which is an integral part of the machine.

In gravity feed machines of the type to which the invention relates a gravity plate is provided to assist in holding the food in the sloping V section chute in the path of the blade. This plate comprises a heavy metal plate mounted on a rail running along one edge of the V chute and mounted on a bearing so as to be adapted to be swung into a transverse position in the chute behind a food piece and to slide freely down the rail under the action of gravity.

According to the invention an angle cutting device in a food slicing machine including a circular cutter, means for rotating the said cutter, a sloping chute of V cross section, means for moving the said chute across the said cutter so as to bring a food piece thereon into cutting relationship therewith, and support means mounted along one edge of the said chute consists of a gravity plate made in two parts hinged together so that while one part remains in the normal transverse position the other hinged part can be turned against the action of a spring, to a position in a plane parallel to a face of the V chute opposite to that carrying the rail on which the gravity plate slides and at such a distance therefrom that a food piece such as a sausage laid thereon at an oblique angle to the cutting blade of the machine can be gripped by the hinged part of the gravity plate and held at the said angle.

When not in use as an angle cutter the hinged gravity plate is held in its normal, flat configuration by the action of the spring.

The device according to the invention has the advantages over devices commonly in use that it does not have to be specially attached to the chute for cutting on the bias, that there is no loss of cutting efficiency when it is in use and that when the biased cutting has once been started the gravity plate can be set in the normal transverse position behind the food so that the whole of it can be sliced.

Figure 2:
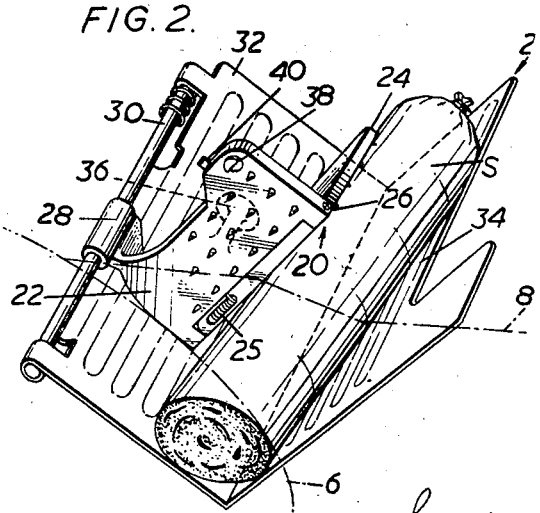

In order that the invention may be thoroughly understood an angle cutting device in accordance with it will be described in some detail by way of example, with reference to the accompanying drawing in which:

Figure 1 shows a gravity feed food slicing machine including an angle cutting device in accordance with the invention; and Figure 2 is an enlarged view of the chute and the gravity plate of the machine of Figure 1.

The machine shown in Figure 1 includes a sloping chute 2 to which a motor 4 is arranged to impart a reciprocal motion. The motor 4 is also arranged to rotate a cutting blade 6 which in operation projects beyond a table 8 which limits the downward movement of a food piece in the chute 2 and co-operates with it in bringing the food into cutting relationship with the blade 6. A sharpener 10 is provided to sharpen the blade.

Cut slices of food falling from the blade 6 are deflected onto a receiving table 14 by a curved deflector plate 16.

A gravity plate 20 consisting of two heavy chromium plated metal castings 22 and 24 hinged together at 26 and urged toward a flat configuration by a spring 25 is mounted by a bearing 8 to swing and slide on a rail 30 running along the upper edge of one face 32 of the V chute 2.

The hinged part 24 of the gravity plate 20 is shown in Figure 2 in a position substantially parallel to the face 34 of the feed chute 2 and gripping a sausage (S) lying on the face 34. Both parts of the gravity plate are provided with spikes for a better grip on the food being cut.

A handle 36 is provided for the manipulation of the gravity plate. When not required for use the gravity plate 20 can be held behind the chute 2 by a clip (not shown) co-operating with a projection 38 on the part 22 of the plate. A rubber buffer 40 is provided.

In operation the feed chute 2 is moved from side to side by the motor 4 and the food is cut by the rotating circular blade 6. The sausage (S) shown in the drawing is accordingly presented to the cutting blade at an oblique angle and is cut into oval slices.

When it is not desired to use the plate 2 as an angle cutter it is simply used in the normal planar configuration which it assumes under the action of the spring 25 contained in the hinge 26.

I claim:

1. In a machine for slicing food, a circular cutter, means for rotating the said cutter, a sloping chute of V cross section, means for moving the said chute across the said cutter so as to bring a food piece thereon into cutting relationship therewith, and support means mounted along one edge of the said chute; a gravity plate comprising a first plate slidably mounted on the said support means and adapted to be swung into a transverse position in the said chute, a second plate hinged to the said first plate, and a spring whereby the two plates are urged toward a coplanar configuration, so constructed and arranged that the second plate can be turned, against the action of the said spring, to a position generally parallel to the face of the V chute opposite to that carrying the said support means and at such a distance from that face that a food piece, such as a sausage, laid on the said face at an oblique angle to the said cutter can be gripped by the said second plate and held at the said angle.

2. A machine for slicing food, said machine including a circular cutter, means for rotating the said cutter, a sloping chute of V cross section, means for moving the said chute across the said cutter so as to bring a food piece thereon into cutting relationship therewith, a rail mounted along one edge of the said chute and a substantially rectangular gravity plate slidably mounted on the said rail and adapted to be swung into a transverse position in the said chute characterised in that the said gravity plate is divided by a hinge into two substantially equal rectangular plates, a spring being associated with the said hinge whereby the said two plates are urged toward a coplanar configuration and the said hinge being substantially normal to the face of the chute on which the said rail is mounted when the said gravity plate is in the operative position.

3. A machine as claimed in claim 2 characterised in that the faces of the two plates comprising the said gravity plate which in operation come into contact with food are provided with a plurality of spikes.

References Cited in the file of this patent

UNITED STATES PATENTS 1,015,859   Walker et al. _____ Jan. 30, 1912

FOREIGN PATENTS 139,708   Australia _____ Dec. 14, 1950